United States Patent [19]

Rice

[11] 4,314,442
[45] Feb. 9, 1982

[54] STEAM-COOLED BLADING WITH STEAM THERMAL BARRIER FOR REHEAT GAS TURBINE COMBINED WITH STEAM TURBINE

[76] Inventor: Ivan G. Rice, P.O. Box 233, Spring, Tex. 77373

[21] Appl. No.: 47,571

[22] Filed: Jun. 11, 1979

Related U.S. Application Data

[63] Continuation-in-part of Ser. No. 954,838, Oct. 26, 1978.

[51] Int. Cl.³ .............................. F01B 5/18; F02C 7/16
[52] U.S. Cl. .............................. 60/39.05; 60/39.14 M; 60/39.18 B; 60/39.54; 60/39.83; 415/114; 415/115
[58] Field of Search ................ 60/39.02, 39.54, 39.05, 60/39.58, 39.83, 730, 39.18 B, 39.19; 415/114, 115, 214; 416/97 R, 97 A

[56] References Cited

U.S. PATENT DOCUMENTS

| | | | |
|---|---|---|---|
| 1,255,924 | 2/1918 | Peaslee | 60/39.54 |
| 3,240,468 | 3/1966 | Watts et al. | 416/97 A |
| 3,443,790 | 5/1969 | Buckland | 415/115 |
| 3,619,077 | 11/1971 | Wile et al. | 415/214 |
| 3,628,880 | 12/1971 | Smuland et al. | 416/97 R |
| 3,628,885 | 12/1971 | Sidenstick et al. | 416/97 R |
| 3,729,930 | 5/1973 | Williams | 416/97 |
| 4,026,659 | 5/1977 | Freeman | 416/97 R |
| 4,153,386 | 5/1979 | Leogrande et al. | 415/115 |

FOREIGN PATENT DOCUMENTS

753633 7/1956 United Kingdom ............... 60/39.54

Primary Examiner—Louis J. Casaregola
Attorney, Agent, or Firm—Harvey B. Jacobson

[57] ABSTRACT

Steam-cooling with a steam thermal barrier for reheat gas turbine vanes and blades offers advantages over cooling with air or water at the higher temperatures characteristic of existing high temperature gas tubines, in particular when coupled with a reheat steam cycle. Consequently, in such a combined cycle, higher cycle efficiency is obtainable for gas turbine initial firing temperatures of about 2500° F. (1371° C.) and 2050° F. (1121° C.) reheat temperatures where over-all combined cycle degradation resulting from steam cooling is below about 1%. A proposed combined reheat gas turbine and steam turbine cycle includes a gas turbine having steam-cooled components operating at a cycle pressure ratio of about 38 without intercooling and includes steam superheating in the reheat combustor.

17 Claims, 20 Drawing Figures

STEAM-COOLED BLADING WITH STEAM THERMAL BARRIER FOR REHEAT GAS TURBINE COMBINED WITH STEAM TURBINE

CROSS-REFERENCE TO RELATED APPLICATION

This application is a continuation-in-part of applicant's copending U.S. application Ser. No. 954,838, filed Oct. 26, 1978.

BACKGROUND OF THE INVENTION

In apparatus for generating useful power by reheating gas turbine exhaust gases, with or without a combined steam cycle, conditions of temperature and pressure producing relatively high cycle efficiencies typically involve sufficiently high temperatures and high pressures to necessitate special cooling of gas turbine components. Conventionally, blade cooling is accomplished with air to extract heat from the blade surface.

The physical properties of air limit its effectiveness as a coolant medium, and impose an upper limit to the temperature attainable in a gas turbine. Moreover, air must be sparingly and very carefully used due to its dearness and its effect on cycle degradation both with respect to power and efficiency. At all cycle pressure ratios, and particularly the higher cycle pressure ratios encountered in apparatus involving reheating gas turbine exhaust gases, very little pressure to be available in the small pressure drops allow only region between the compressor discharge and the nozzles and blades for air cooling.

Other approaches to gas turbine component cooling being studied, researched and developed include transpiration air cooling, water cooling and alternative materials of construction capable of withstanding the conditions encountered.

Many additional problems incident to prior approaches to component cooling include corrosion of the metal surfaces at high temperatures, low-cycle metal fatigue, radiant heat absorption, and first-stage nozzle and blade surface fouling during start-up and operation. The following references are cited as background for the present invention and disclose the proposed combined reheat gas turbine and steam turbine cycle which is the basis of the parent application, U.S. Ser. No. 954,838.

(1) Rice, I. G., "The Combined Reheat Gas Turbine/Steam Turbine Cycle", Part I—"A Critical Analysis of the Combined Reheat Gas Turbine/Steam Turbine Cycle", ASME Paper No. 79-GT-7, ASME Journal of Engineering for Power, 1979

(2) Rice, I. G., "The Combined Reheat Gas Turbine/Steam Turbine Cycle", Part II—"The LM 5000 Gas Generator Applied to the Combined Reheat Gas Turbine/Steam Turbine Cycle", ASME Paper No. 79-GT-8, ASME Journal of Engineering for Power, 1979

The above references describe essentially the invention disclosed in the parent application for patent of which this is a continuation-in-part. Other material pertinent to the present invention include published studies of the effects of steam injection on the performance of gas turbine power cycles for combined cycles, where steam is evaluated as a form of injection to augment power and to control nitrogen oxide emissions. However, no studies have been made with respect to the combined reheat gas turbine and steam turbine cycle without intercooling as the combined cycle of the present invention and no evaluation of steam as a coolant is presented as a way to optimize the combined gas turbine and steam turbine cycle, nor is the apparatus disclosed herein described.

SUMMARY OF THE INVENTION

In order to obtain the necessary operating temperatures and pressures at which a gas turbine in a combined reheat gas turbine and steam turbine cycle is to be operated for maximum efficiency, steam is used as a coolant and a thermal barrier. The combined cycle of the present invention optimizes the gas turbine cycle pressure ratio and simultaneously takes advantage of the cold heat steam formed from the steam turbine in order to provide vane and blade cooling for the gas generator first stage, and to utilize extracted steam to provide cooling for second-stage gas generator blading and the power turbine blading.

The invention contemplates use of film cooling employing steam as the coolant, whereby steam with higher coolant working pressures available and higher specific heat and superior radiant, conductive, and convective cooling characteristics is an advantageous alternative to air as a coolant. Moreover, steam can be used in film cooling to advantage without sacrificing blade surface roughness, which can be critical where high Reynolds numbers are encountered.

Accordingly, an important object of the invention is to provide a process of using a combined reheat gas turbine and steam turbine cycle with pressure ratios and temperatures capable of giving high cycle efficiency turbine operations including use of steam cooling with a steam thermal barrier for gas generator blading and power turbine blading.

Another object of the invention is to provide the combined power generating cycle and enable use to be made of cold reheat steam from a steam turbine for first-stage blade cooling of the associated gas generator, while taking advantage of use of extracted steam for cooling the second-stage gas generator blading and the power turbine blading.

Still another object is to employ film cooling of gas turbine blading with use of steam.

Yet another object is to take advantage of steam cooling to provide steam-cooled gas turbine internal apparatus having low-cycle fatigue prevention, hot corrosion protection, and first-stage nozzle and blade sonic cleaning during start-up.

A further object is to provide a combined cycle having a built-in starter for the gas generator.

Another further object is to apply steam as a blade coolant to take full advantage of the superior physical properties of steam as a coolant and to optimize integration of such coolant with the steam cycle characteristics, such properties including specific heat, viscosity, conductivity, radiation absorptivity and Prandtl number.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The possibility of use of a combined reheat gas turbine and reheat steam turbine cycle, as disclosed in applicant's copending application Ser. No. 954,838, of which this is a continuation-in-part, leads to the prospect of using extracted steam from a conventional steam cycle to advantage. Such a cycle can optimize the gas turbine-cycle pressure ratio, while at the same time taking advantage of the cold reheat steam generated by the steam turbine for first-stage blade cooling of the gas generator. Extracted steam can also be used for cooling the second-stage gas generator blading and the power turbine blading. Under typical reheat cycle steam conditions of 2400 psig-1000/1000° F. (16.56 Mpa and 538/538° C.), such as the conditions disclosed in applicant's copending Ser. No. 954,838, steam possesses superior physical characteristics as a coolant when substituted for conventionally used air. With use of conventional methods of nozzle and blade casting, together with metallurgical techniques within the present state-of-the-art, base-load firing temperatures of the gas turbine can be increased according to the methods and apparatus of the present invention from the present level of about 2100° F. (1149° C.) to about 2400° F. (1315° C.) or higher. These physical characteristics, including specific heat, viscosity, conductivity, radiation absorptivity, and Prandtl number, lead to substantial advantages of steam for cooling, even taking into account the specific volume and sonic velocity. The conventional coolant, air, must be used sparingly and very carefully, primarily due to its effect on cycle degradation with respect to power and efficiency. Nevertheless, despite the fact that a very small pressure drop exists between the compressor discharge and the nozzle and blade, hindering the amount of cooling air available, and despite the fact that at higher cycle pressure ratios, the coolant temperature increases to its detriment, highly developed convection and film-cooling techniques have been developed using air as a coolant, initially for aircraft use, and later for use with industrial gas turbines.

Turbine nozzle and rotating blade design components can be steam cooled and thermal barrier protected to achieve about a 55% Lower Heating Value (LHV) combined cycle efficiency according to the teachings which will be hereafter outlined.

Figure 1:
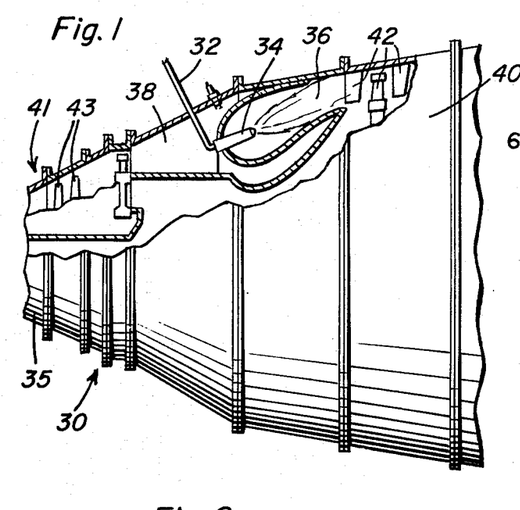
FIG. 1 is a side elevational view, partly in a diagrammatic section, of a gas generator and a reheat power turbine, such as can be used in a combined reheat gas power turbine and steam turbine cycle, the components of which can be cooled by steam to permit high temperature and high pressure operation according to the present invention.

FIG. 1 illustates a portion of the axial flow reheat gas turbine disclosed in applicant's pending application, U.S. Ser. No. 954,838. As shown a gas generator 41, gas generator blading 43, a reheat combustor 30, including fuel line 32, fuel nozzle 34, annular combustion region 36, duffuser 38, and power turbine combustion region 40 and power turbing blading 42 are structured to provide linear gas flow throughout, substantially reducing the pressure drop across the combustion region 36. Ordinarily, a plurality of fuel nozzles 34 are arranged concentrically to produce the annular flow of reheat gas to drive the power turbine located rightwardly of FIG. 1. Gas generator and reheat combustor comprises components, such as blading 43 and 42, respectively, which must withstand the temperatures generated by heated gases in annular gas generator combustion region 35 and power turbine combustion region 36. Accordingly, the temperature of combustion gases obtainable is limited by the ability of internal components to maintain structural integrity and be free from corrosion for prolonged periods of operation. With the present invention, cooling of these components by use of steam permits higher operating temperatures to be attained with minimum cycle degradation and with greater efficiency than if such components were air cooled. An over-all increase in efficiency can result over and above the power plant efficiency approaching or exceeding 50% LHV (Lower Heating Value) disclosed in applicant's application Ser. No. 954,838. In fact, an efficiency approaching or exceeding 55% LHV is possible with use of steam cooling and thermal barrier protection as taught by the present invention.

Figure 2:
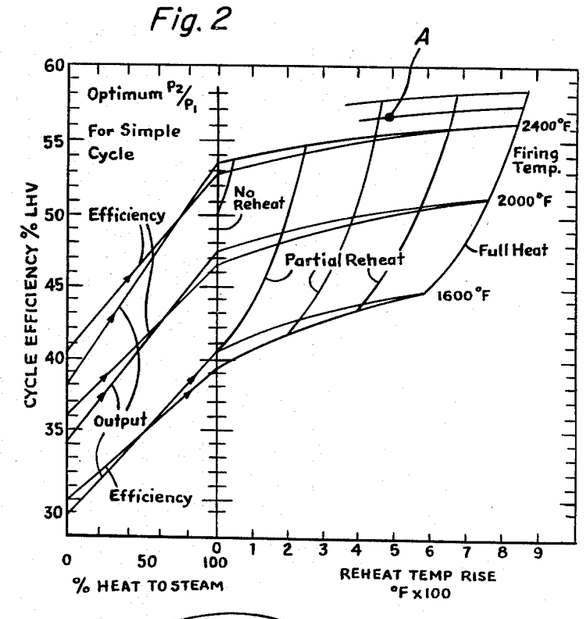
FIG. 2 is a graph showing cycle efficiencies for simple and reheat gas turbines combined with the steam turbine where efficiency is shown as a function of the percentage conversion of heat to steam under the optimum pressure ratio for the simple cycle efficiency and output and as a function of three firing temperatures in the left-hand portion, and cycle efficiency as a function of optimum pressure ratio for the reheat cycle efficiency and cycle output and as a function of the gas reheat temperature rise for three firing temperatures is shown in the right-hand portion.

An over-all picture of combined cycles in terms of cycle efficiencies is presented in FIG. 2, the left portion showing the simple cycle gas turbine efficiency for the two optimum conditions of compression ratio for output and for efficiency. Efficiency rises as the heat is absorbed by the boiler and converted to work. At the point where 100% of the heat obtainable is recovered (vertical axis inside the graph of FIG. 2), a new parameter is plotted along the horizontal axis, namely gas reheat temperature rise in a combined gas reheat and steam turbine cycle. With no gas reheat, but 100% conversion of heat to steam, points along the intermediate axis can be read. However, cycle efficiency rises as reheat temperature rises, in the manner shown in the right portion of FIG. 2. Point A in FIG. 2 represents a firing temperature of 2500° F. (1371° C.) and reheat temperature of 2050° F. (1121° C.), a higher value than was disclosed in application Ser. No. 954,838. This temperature, with consequent higher efficiency, is obtainable due to use of steam cooling as taught by the present invention. The theoretical efficiency obtainable is shown from FIG. 2 to be 56.7% LHV as denoted by point A. This curve does not compensate for blade cooling, but summarizes the theoretical maximum obtainable. If steam is used for blade cooling and if the steam can be heated to within 300° F. (167° C.) of the firing temperature in the process of blanket cooling or thermal barrier cooling, then the combined cycle efficiency would be slightly degraded to a value of about 56% LHV, and if a safety factor is applied for the steam (to be heated to a lower value of approximately 600° F. (333° C.), then 55% LHV can reasonably be selected as a target efficiency value. Accordingly, with the higher firing temperatures and efficiencies obtained, considerable incentive exists to maximize blade cooling and thermal barrier protection by use of steam.

Figure 3:
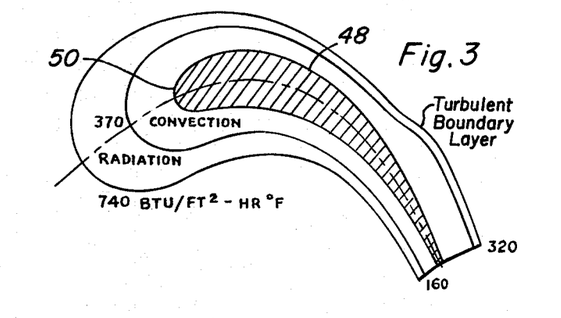
FIG. 3 is a schematicized sectional view of a first-stage nozzle vane showing regions of typical radiation and convection heat flux around the vane, bounded by combined heat transfer coefficients for 2000° F. (1093° C.) turbine inlet temperature.

Modern-day gas turbines which fire at elevated temperatures and at higher cycle pressures encounter greater heat flux to the combustor and blading components, including far more radiant heat transfer as well as greater convective heat transfer. With respect to the combustion liner, flame radiation is a dominant factor. A number of variables are involved, including flame temperature, combustion pressure, flame luminosity, flame dimensions, combustor geometry and the emissivity and absorptivity of both the gases and the liner. Combustion conditions, such as type of fuel, development of soot or smoke, and the like, affect the radiation produced from the three primary sources, namely non-luminous $CO_2$, non-luminous water vapor and hot glowing sub-micron carbon particles, often described in the art as radiant clouds. Radiant heat transfer for known first-generation 70 psia gas turbine liners have been reported to be upwards of 175,000 BTU per Sq Ft-Hr. A second-generation 25 ratio combustor, on the other hand, has a radiant heat transfer rate of 230,000 to 280,000 BTU per Sq Ft-Hr. At these rates and a 1500° F. (833° C.) temperature differential between the flame and liner, the effective heat transfer coefficient is about 167 BTU per Sq Ft-Hr per °F. Expressed in terms of average firing temperature, this coefficient becomes about 400 BTU per Sq Ft-Hr per °F. FIG. 3 illustrates typical heat flux values, where the total transfer coefficients around vane 48 are resolved into radiation and convection values, which are independent of each other. Leading edge 50 of vane 48 points toward the combustor flame for most gas turbines and absorbs radiant heat at a level of about 400 BTU Sq Ft-Hr per °F., the heat flux being related to inlet temperature and not to flame temperature. The leading edge gas film is squeezed to a very thin film due to the stagnation pressure and velocity profile characteristics, which factors cause a very high convection heat transfer rate. The total transfer coefficient is the sum of the two radiation and convection factors and is, shown on FIG. 3 to be about 740 BTU per Sq Ft-Hr per °F.

Figure 4:
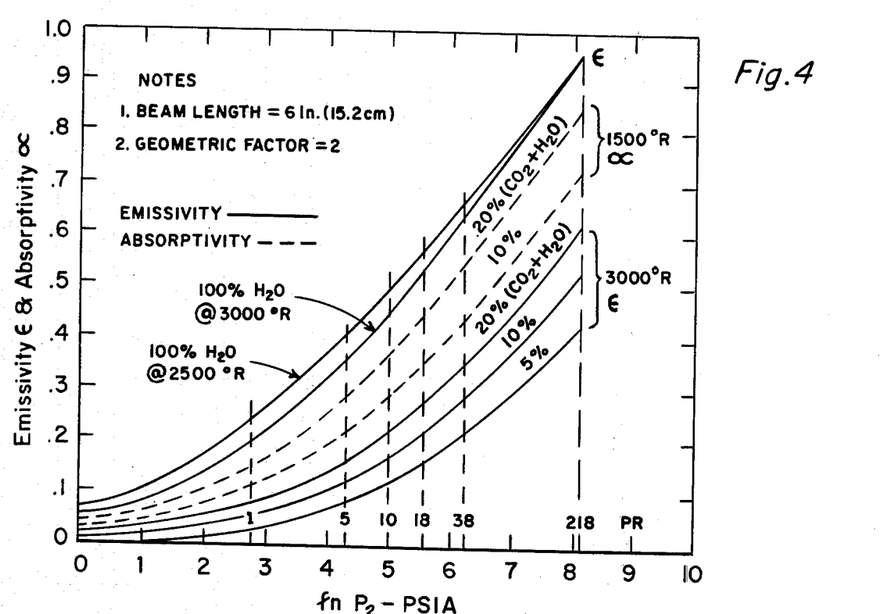
FIG. 4 is a graph of emissivity and absorptivity as a function of the natural logarithm of pressure in PSIA. For steam and for combustion products.

Heat transfer by radiation varies as the fourth power of the absolute temperature in accordance with Stefan-Boltzmann's Law. FIG. 4 provides values of emissivity and absorptivity as a function of the natural logarithm of pressure is PSIA. These values can be applied to the above mentioned radiation law to calculate radiant heat flux.

The pressure side of vane 48 has a rather constant heat transfer coefficient of about 160 BTU per Sq Ft-Hr per °F., as shown in FIG. 3. However, the suction side develops a hump two-thirds of the way downstream, at which point the boundary layer is thought to thicken and become more turbulent. At this point, the heat transfer coefficient doubles to about 320 BTU per Sq Ft-Hr. per °F. The radiant heat portion of the total heat transfer coefficient is reduced where the blade surface is exposed only to the radiation of the carbon particle cloud and the $CO_2$ and $H_2O$. This portion might be about 25% of the total for a gas temperature of around 2100° F. (11149° C.).

Figures 5, 6:
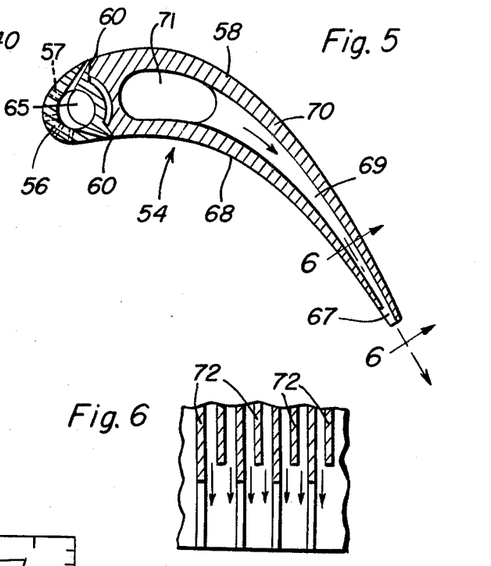
FIG. 5 is a transverse sectional view of a first-stage nozzle vane adapted for use of steam as a coolant.
FIG. 6 is a sectional view of the trailing end of the nozzle vane of FIG. 5, taken substantially upon a plane passing along section line 6—6 of FIG. 5.

In conventional air-cooled first-stage nozzles for gas turbines constructed according to present technology, many cooling weep holes on the vane surface and leading edge are provided to permit cooling air to exit outwardly and stream over the vane nozzle surface in the form of a thin film. If steam is substituted for air, first-stage nozzle design of the gas generator is modified to the form shown in FIGS. 5, 6, 7 and 8. FIG. 5 suggests that leading edge 56 of vane 54 be constructed separately from vane body 58 and allowed to float as leading edge 56 expands radially inwardly from a fixed peripheral anchor point positioned on the leading edge and body alignment and positioning surfaces 60. It should be noted that leading edge 56 receives the greatest heat flux from radiation and convection, and separation of leading edge 56 will keep heat away from body 58 of vane 54. Leading edge weep-holes 57 can additionally be employed on leading edge 56 to assist in absorption of radiant heat.

Figure 7:
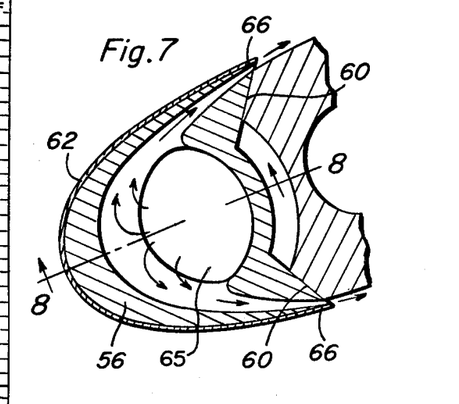
FIG. 7 is an enlarged sectional view of the leading edge of the head of the nozzle vane of FIG. 5, showing flow of steam therethrough.
Figure 8:
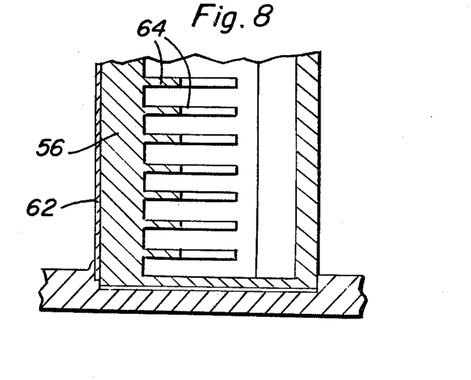
FIG. 8 is a longitudinal sectional view of the leading edge of the nozzle of FIG. 7, taken substantially upon a plane passing along section line 8—8 on FIG. 7.
Figure 9:
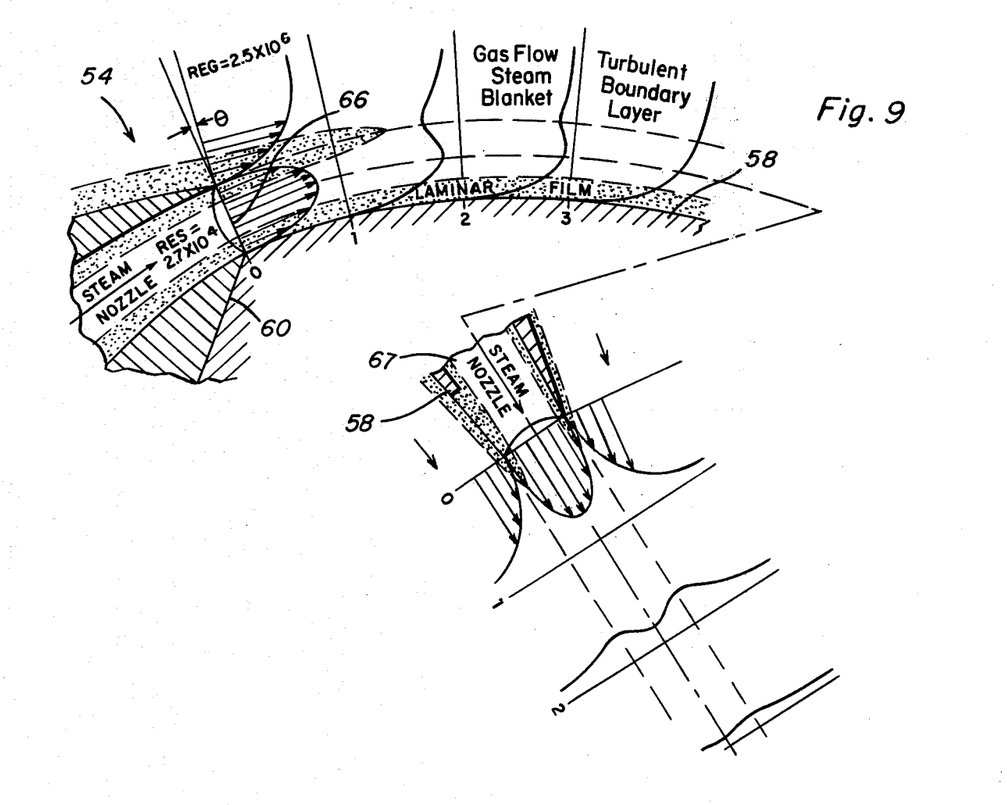
FIG. 9 is an enlarged sectional view of the nozzle portions of the vane of FIG. 5, showing velocity profiles for the gas generator first stage nozzle vane steam nozzle.

Built-in steam nozzles 66 are incorporated in leading edge 56, as is best seen in the enlarged view of FIG. 7. Leading edge 56 can be made of solid ceramic material or coated with ceramic thermal heat barrier 62. As shown in FIGS. 7 and 8, internal cavity or steam distribution plenum 65 provides coolant steam to nozzles 66. The internal surface of each nozzle 66 has extended-surface horizontal fins 64 for convective heat removal from leading edge 56. Fins 64 also provide steam-nozzle guides or ducts. Floating loading edge 56 can be made removable from body portion 58 so that replacement or recoating is easy during overhaul of vane 54. Preferably, steam exists along the surfaces of vane 54 through leading edge nozzles 66 tangentially, or as closely as possible to tangentially, with a very small reactive velocity. The steam exit velocity through nozzles 66 should be equal to or slightly higher than the entrance velocity of the gas stream. An average velocity might be about 700 feet per second (213 m per second). Steam can also exit through trailing edge nozzle 67 on trailing edge portion 69 and will preferably emerge with a velocity nearly equal to the gas velocity near nozzle 67. The amalgamation of the coolant steam velocity profile with the gas steam is shown in FIG. 9 at the nozzle slot exits. The laminar films are shown on the internal surfaces of the nozzle as well as on the vane surfaces. Where the steam and gas meet laminar flow exists for both gases, leading to a healing effect of the wake and a smooth transition of velocity between the two fluids until the steam boundary layer is established.

The pressure inside the plenum 65 made possible by the selection of the gas turbine cycle-pressure ratio of about 38, as well as by using the cold reheat line from the steam turbine, is about 60 psi (0.414 MPa) greater than the surrounding gas pressure when allowance is made for the pressure drop in the steam line to the nozzles. This pressure differential then provides an exit velocity of about 700 feet per second. The desired result is for the steam tangential velocity to match the gas stream velocity in order to disturb the flow as little as possible, and in the process, a blanket or boundary layer of steam can be established over the surfaces of vane 54 to serve both as a radiant heat absorbant and a retardant to conduction of heat to the blading. A thin laminar flow is maintained on the surfaces of vane 54 similar to the oil film wedge of a journal bearing. This boundary layer should be stable on the pressure sides of the vane (concave) surface 68, but on the suction (convex) side 70, there is a thickening of the boundary layer where film effectiveness might be reduced. Therefore, horizontal extended surface fins 72 (best seen in FIG. 6) can be incorporated at the internal surfaces of trailing edge nozzle 67 for convection cooling. Steam flow to the trailing edge from steam distribution plenum 71 can reasonably be assumed to be approximately $\frac{1}{4}\%$ of the main gas flow. The steam exit velocity from plenum 71 will be about equal to the nozzle exit velocity to reduce exit losses.

The steam nozzle edge should be as sharp as practical to minimize eddy current disturbances at the exit point near nozzle 66. The width of the nozzle should preferably be rather small and is calculated to be about 0.010 inches (0.25 mm) for 1-$\frac{1}{2}\%$ steam flow and one inch radius between nozzle vanes. However, a 60 psi (0.414 MPa) pressure drop through nozzle 66 should keep the slots blown clean and prevent plugging by ash deposits.

Nozzle side-wall cooling is also important when high inlet temperatures are involved. Side slots and weep-holes on both the outer and inner walls would be necessary to film-cool the surfaces with steam.

The general arrangement shown in FIGS. 5 to 8 points to other advantages of steam cooling. The steam can be used to start the gas generator as there is ample flow of steam. Considering a LM 5000 gas generator and $1\frac{1}{2}\%$ of the gas flow as steam, the rate of steam generation required is about 15,000 lbs. per hour (6804 Kg/hr). At a water feed rate of 20 lbs./KWHr (9.07 Kg/KWHr) the power made available would be about 1005 HP (750 KW). With blade-cooling steam, the starting horsepower would be about twice this value.

Another advantage of steam cooling is the nozzle and blade-cleaning ability of steam when the gas turbine is shut down. Steam at about 30 psia (0.207 MPa) can reach sonic velocity out nozzle 66. Any ash deposit can be cleaned off the blading. A built-in form of steam lance is accordingly present.

Figure 10:
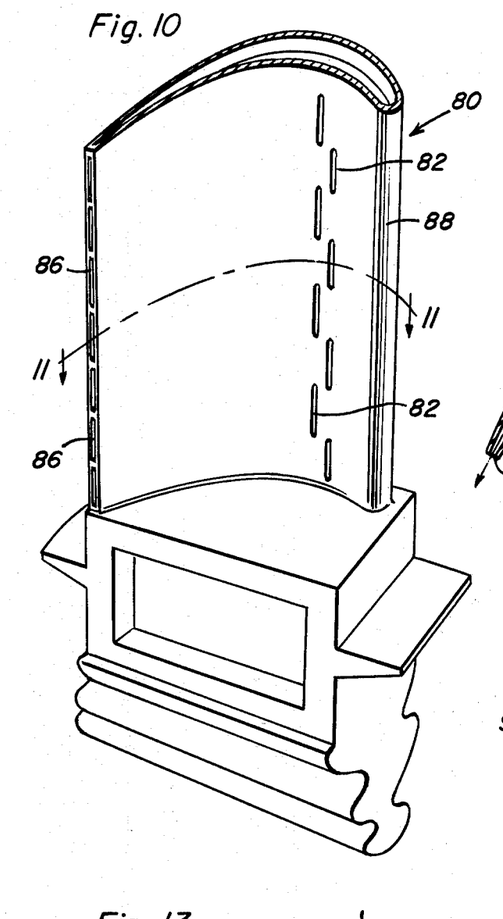
FIG. 10 is a perspective view of a steam-cooled gas generator first-stage rotating blade.
Figure 11:
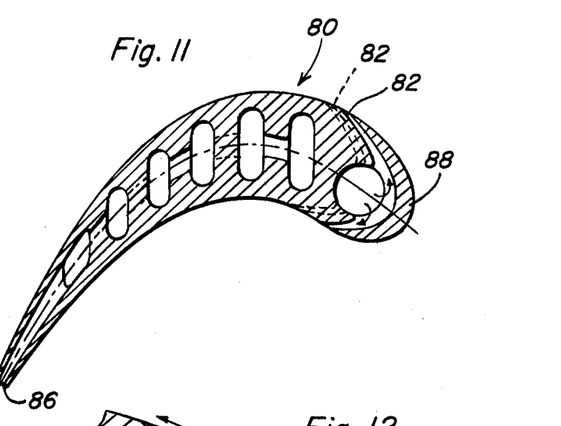
FIG. 11 is a transverse sectional view of the rotating blade of FIG. 10, taken substantially upon a plane passing along section line 11—11 on FIG. 10, and showing circulation patterns of steam therethrough.

When steam is applied, the general concept of cooling as suggested for the nozzle vanes can be used for rotating blades, such as blade 80 illustrated in FIG. 10, in a perspective pictorial view, and shown in section in FIG. 11. Overlapping slots 82 are substituted for the single long slot of the blade of FIG. 5 in order to give blade 80 added strength to withstand centrifugal forces. Slots 86 are used at the trailing edge of blade 80 for the same reason. It is important that the air foil surface be as clean as possible. Air cooling as presently used produces surface roughness which is detrimental, such surface roughening being capable of being reduced considerably, particularly with respect to the leading edge 88 if adequate convective cooling can be realized with steam. Weep-holes (not shown) in leading edge 88 are to be avoided if possible for aerodynamic reasons; however, such holes could be helpful in reducing the radiant heat absorption, but in any event should be used sparingly, if at all.

Figure 12:
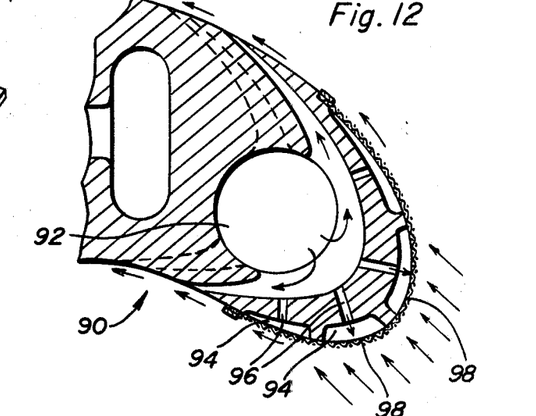
FIG. 12 is an enlarged sectional view of the front portion of an alternative embodiment of rotating blade incorporating leading edge transpiration steam cooling and thermal barrier steam flow.

A second form of rotating blade adapted for steam cooling is shown in FIG. 12, where another alternative to the high leading edge heat flux involves incorporating transpiration cooling at a sacrifice in surface roughness. Blade 90 shows how such a process can be accomplished using transpiration cooling with steam as the coolant. Steam is metered from plenum chamber 92 to transpiration chambers 94 through small orifices 96. The steam under controlled pressure is then allowed to flow through porous wire braiding 98. Transpiration cooling using air as the coolant is presently under active investigation, as is well-known by those skilled in the art, with extensive research and development work presently under way. However, attention has not yet been focused on the advantage of steam for transpiration cooling or to the question of whether extraction steam is purer than extracted air. When appropriately controlled vaporization processes are used, the steam introduced into plenum chamber 92 is purer than air presently used, and deposits which would otherwise form or plug the pores in wire braiding 98 are less with the steam than with the conventional air cooling.

Transpiration cooling can also be applied if required to the rear suction side of blade 90, where greater turbulence and greater heat flux exist, such method again being at the sacrifice of surface roughness and its effect on heat transfer and aerodynamics.

Figure 13:
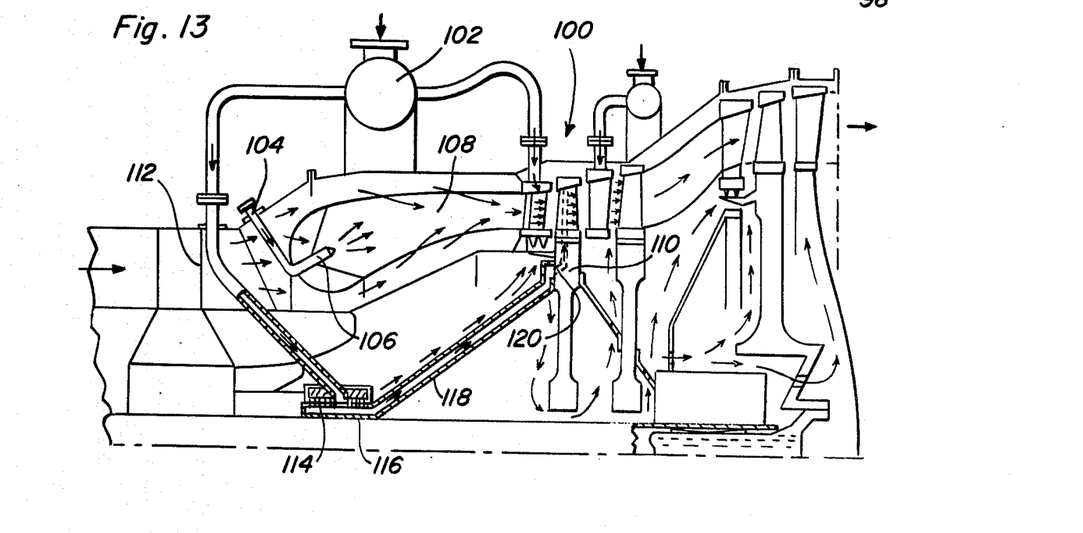
FIG. 13 is a schematicized sectional view of a gas generator incorporating steam cooling.

The cooling steam is introduced through the turbine wheel in a manner similar to that in which air is introduced with present conventional air cooling techniques. However, in order to obtain a higher pressure inside the blades, a modified approach is desirable, as shown in FIG. 13. Steam enters steam header 102 of gas generator 100. Gas feed line 104 furnishes combustible gas to fuel nozzle 106, and heated gases are formed in combustion region 108 to pass through turbine wheel 110. Cooling steam is introduced through turbine wheel 110 where steam lines are brought through bearing struts 112 to a labyrinth packing or seal 114 at the small diameter of shafting 116. Steam then flows internally in annular cavity 118 up to entrance holes 120 of turbine wheel 110. No internal vanes in the cavity are present in order to minimize pumping losses and steam-head buildup. The blades are preferably sealed off with flexible metallic-type gaskets at the roots of the blades so that steam pressure can be maintained. In addition, power turbine blading also must be cooled in view of the 2000° F. (1093° C.) inlet temperature of gases contacting the power turbine blading. Although the same approach to cooling can be used as for cooling turbine wheel 110, the power turbine blades are larger and have a greater surface area, necessitating careful utilization of steam in order to avoid degrading cycle efficiency. Low-pressure extraction steam is used for this purpose, in a quantity of approximately 1½%.

A significant advantage in using steam as a coolant comes in the area of low-cycle fatigue and thermal shock experienced by metal nozzle vane and blade components during start-up. More importantly, however, low-cycle fatigue and thermal shock resistance are important considerations on full-load trip-out or load dumping from full load to no load. The effect of low-cycle fatigue is perhaps ten times more deleterious on emergency shut-down than on start-up, inasmuch as the compressor discharge air quenches the hot vanes and blades as gas temperature drops suddenly. With use of steam as a coolant where a small start-up boiler and a steam accumulator for shut-down are provided, it is possible to program the cooling steam on start-up and shut-down. Proper control valves and process controllers enable use of such a start-up boiler and steam accumulator. After shut-down, steam is admitted at a programmed rate of decay with built-in time constants to keep the blades under a controlled temperature drop.

A further consideration with use of steam concerns hot corrosion (sulfidation), which becomes more critical at the elevated temperatures encountered in the proposed process. Various coatings have been developed to help protect blade surfaces where corrosive products of combustion come in direct contact with the blades and the protective coatings. If a blanket of steam is maintained over the blade surfaces, contact of corrosive elements is substantially, if not entirely, avoided at the blade surfaces. Only the heavy particles of corrosive combustion products can penetrate the steam film to reach the blade surfaces because of their mass and momentum. Leading edges 88 or 56, however, are exposed and protective coatings would be required, such as protective coating 62 shown in FIG. 7. Thermal-barrier ceramics and/or plasma-sprayed coatings can be applied, such as alloys of platinum, chromium, and aluminum.

Figure 14:
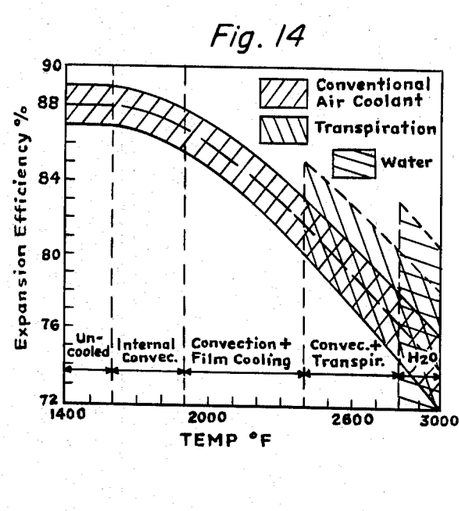
FIG. 14 is a graph showing the relationship of adiabatic expansion efficiency as a function of firing temperature for various methods of cooling.

The foregoing approaches and techniques enable full advantage to be taken of the superior properties of steam as a blade coolant and thermal barrier, and enable integration of the coolant with the steam cycle. There are distinct differences in the physical properties of steam and air which affect heat transfer and cooling characteristics of gas turbine vanes, blades and disks. It is necessary to provide for steam cooling due to the unsuitability of conventional cooling techniques at higher firing temperatures. For example, FIG. 14 provides an indication of the problem faced with current technology where adiabatic expansion efficiency is plotted as a function of firing temperature for various methods of cooling. The curve presents a broad band of efficiency levels, and shows that there is point of diminishing return in terms of cycle efficiency and gas turbine output with use of air as a coolant, further suggesting that it is possible that this point has now been reached for industrial gas turbine at about 2100° F. (1149° C.).

Figure 15:
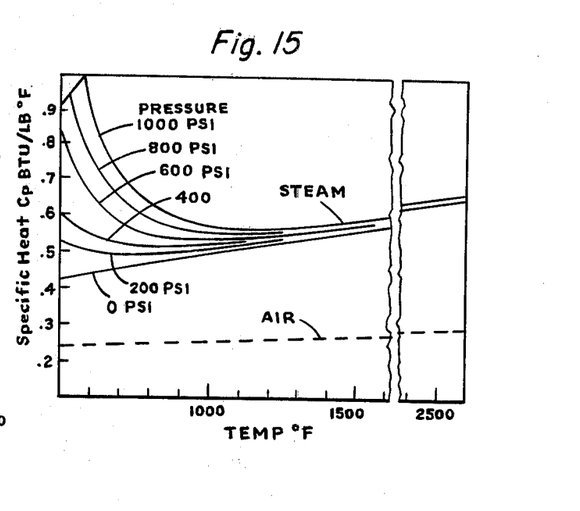
FIG. 15 is a graph showing the specific heat of steam and air as a function of temperature.

Perhaps the most significant difference between steam and air as a coolant concerns their relative specific heats, or the capacity to absorb heat for a given temperature rise. FIG. 15 graphically compares the specific heat of steam with air and shows the distinct difference and advantage of steam over air. While the specific heat of air remains almost constant over a wide range from 500° F. to 2400° F. (260° C. to 1316° C.), the specific heat of steam, besides being about twice that of air, also fluctuates with both pressure and temperature. The specific heat of steam in the region of concern for gas turbine blade cooling varies from about 0.85 at 600 psi (4.14 MPa) and 500° F. (260° C.) to a value of about 0.63 at 100 psi (0.690 MPa) and 2000° F. (1093° C.). The specific heat rises from 0.50 to 0.60 at lesser pressure for the same temperature range, again reflecting over twice the heat absorbing capacity of air and making steam a far better coolant for gas turbines than air.

Figure 16:
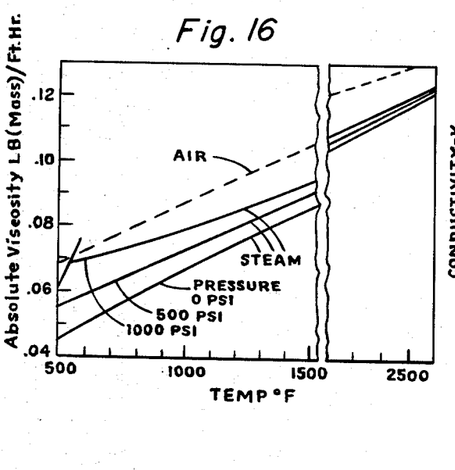
FIG. 16 is a graph describing the absolute viscosity of steam and air as a function of temperature.

Further, steam has a lower viscosity than air in the range of pressure and temperature encountered in blade cooling. FIG. 16 shows the relationship between absolute viscosity and temperature for both steam and air. The viscosity of both air and steam rises with temperature at about the same rate. Although the viscosity of steam is only moderately lower than air, there is an advantage due to friction factors and Reynolds numbers for heat transfer and flow characteristics in the laminar film region and boundary layer near the contact surface, the Reynolds number being inversely proportional to the viscosity.

Figure 17:
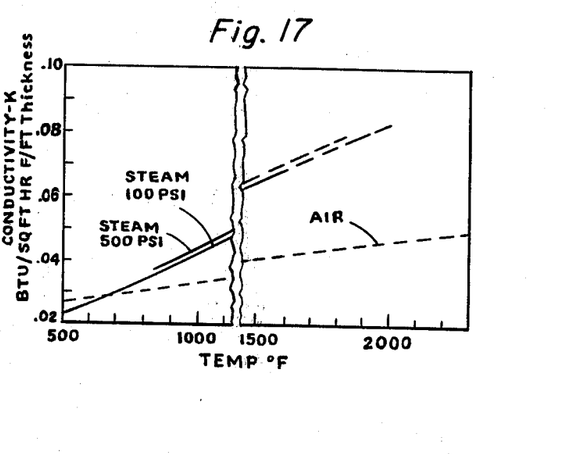
FIG. 17 is a graph showing the conductivity of steam and air as a function of temperature.
Figure 18:
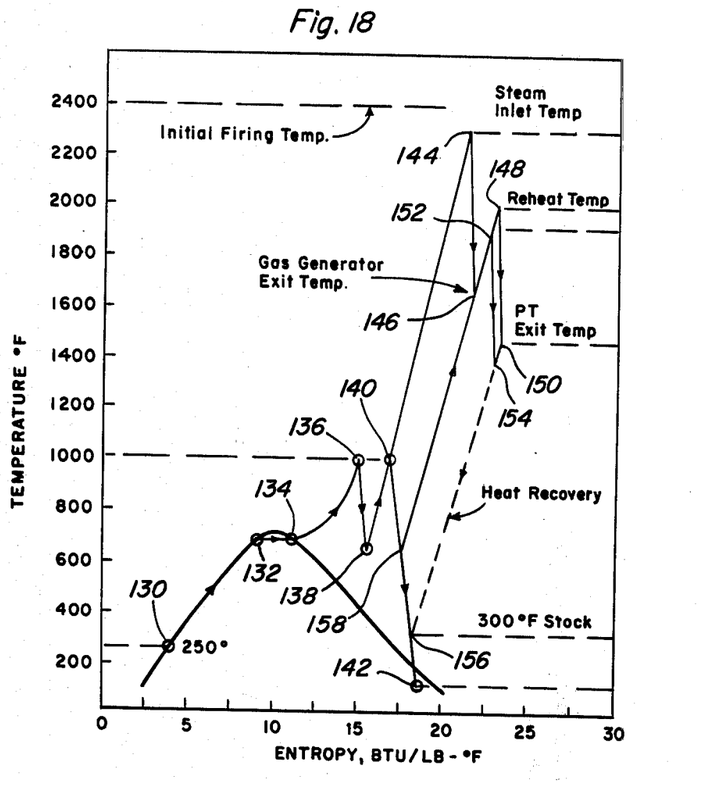
FIG. 18 is a temperature-entropy diagram for the reheat steam turbine cycle with cooling steam applied to a reheat gas turbine.
Figure 19:
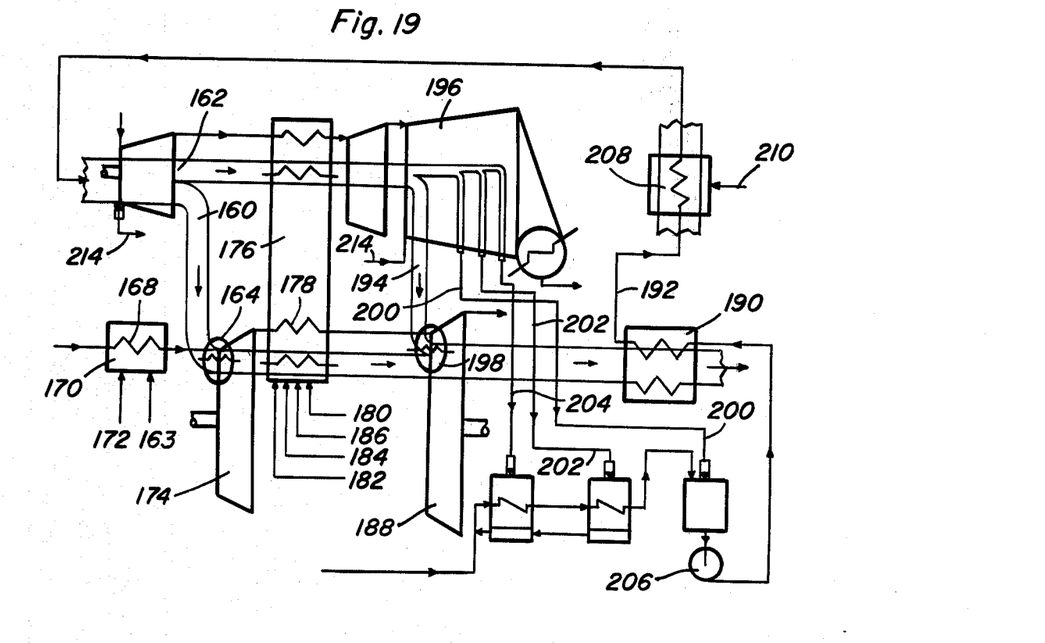
FIG. 19 is a cooling steam schematic flow diagram for a reheat steam turbine and reheat gas turbine.

Another characteristic of steam relevant to heat transfer is its thermal conductivity, namely, the ability of heat to be transmitted within or through the fluid itself. FIG. 17 shows the relation between thermal conductivity and temperature for both steam and air. The superior characteristic of steam is particularly apparent at the elevated temperature encountered in blade cooling, the conductivity of steam being about 50% higher than air at 1500° F. (816° C.).

Radiation to and from non-luminous gases is another important factor to be considered in heating and cooling of blading, particularly at elevated temperature levels of around 2400° F. (1316° C.). At such temperatures, 30% or more of the heat transfer is in the form of radiant energy. When a thin layer of relatively cool steam blankets the vanes and blades, the steam is an excellent radiant heat absorber. At elevated temperatures, carbon dioxide and water of combustion, as well as any water present which has been introduced for nitrogen oxides control (both the carbon dioxide and water being present in low partial pressures), the film of pure steam around the vane and blades will absorb much of the combustion radiant heat, and will re-emit this energy at a much lower energy content and heat rate. Much of the radiant heat will be carried away with the continuous flow of steam before it can enter the blades. Cooling air presently used for cooling does not have this characteristic, and almost all of the radiant heat present passes directly into the blades.

A further consideration in evaluating heat transfer is the Prandt 1 number, a higher value indicating significantly better heat transfer, as is well-known in the art. For steam at low pressures, this number drops from 0.98 at 600° F. (316° C.) to 0.88 at 1200° F. (649° C.), while for air the corresponding Prandt 1 number is 0.70 at 600° F. (316° C.) and 0.65 at 1400° F. (760° C.).

Other comparisons are also significant in evaluating the relative comparison of steam and air involve the specific volume and sonic velocity relative to piping and passageway sizes and critical area nozzle considerations. These characteristics are given in Table I:

TABLE I

| Temperature °F. | Specific Volume Cu Ft/Lb | | | | Sonic Velocity Ft/Sec | |
|---|---|---|---|---|---|---|
| | 100 psia | | 600 psia | | | |
| | Air | Steam | Air | Steam | Air | Steam |
| 400 | 3.186 | 4.937 | .5310 | — | 1431 | 1764 |
| 800 | 4.667 | 7.446 | .7779 | 1.189 | 1717 | 2113 |
| 1200 | 6.149 | 9.860 | 1.025 | 1.621 | 1955 | 2402 |
| 1600 | 7.631 | 12.258 | 1.272 | 2.033 | 2165 | 2654 |
| 2000 | 9.113 | 14.65 | 1.519 | 2.442 | 2356 | 2880 |
| 2400 | 10.594 | 17.036 | 1.766 | 2.839 | 2534 | 3090 |

SIU Conversion:
F = 9/5C + 32
Cu Ft/Lb = 62.43 cm³g
Ft/sec = .3048 m/sec
Ref. (7) for steam and (6) for air It is to be noted that the specific volume for air is less than that of steam for the same pressure and temperature, but when taking into consideration the difference in specific heats, the relative volume of steam required is less. For example, at 800° F. (427° C.) and 600 psi (4.14 MPa), the specific heat for steam and air are 0.56 and 0.26, respectively (see FIG. 15), and the relative specific volume of steam compared to air is 0.26 divided by 0.56 multiplied by 1.189, giving 0.5521 cu ft/lb compared to 0.7779 cu ft/lb for air. The piping cross-sectional area in this example is therefore about 30% less for equal-velocity steam than for air.

Considering compatible cycle pressure ratios for the optimum simple cycle gas turbine to be 18 and that of the reheat turbine to be 38 for 2400° F. (1316° C.) initial inlet temperature, data on the various losses utilizing air as a vane and blade coolant can be tabulated and summarized as given in Table II:

TABLE II

| | Simple Cycle R = 18 T = 2400° F. | | Reheat Cycle R = 38 T = 2400/2000° F. | |
|---|---|---|---|---|
| | % Power Loss | % Eff. Loss | % Power Loss | % Eff Loss |
| GG 1st Stage 6% CA | 7.0 | 1.8 | 3.6 | 2.1 |
| GG 2nd Stage 3% CA | 3.5 | .7 | 1.8 | 1.1 |
| GG 3rd Stage 1% CA | 1.0 | .2 | — | — |
| PT 1st Stage 3% CA | — | — | .3 | .3 |
| TOTAL | 11.5 | 2.7 | 5.7 | 3.5 |

Notations:
GG = Gas Generator
PT = Power Turbine
CA = Cooling Air.

The third stage of the simple cycle gas generator with its 18 pressure ratio requires cooling air because of the lower expansion ratio and the higher temperatures encountered whereas the temperature drops faster for the higher ratio of 38 for the reheat cycle.

Table II indicates that if there were no colling air required, the output would increase significantly and also the cycle efficiency would improve appreciably. This point is important and will be used later when considering substituting steam for air as the coolant.

It should be noted that the exhaust temperature is about the same or slightly higher. There is no cooling effect; this would raise the temperature but at the same time more work would be extracted which would again lower the temperature.

It has been shown that allowing the cooling air to remain in the main gas stream will increase both power output and gas turbine cycle efficiency. The effect steam has on over-all combined-cycle performance can now be studied and correlated with air cooling data.

The over-all cycle of the steam working fluid in the combined cycle is given in FIG. 21 where cycle temperatures are plotted against cycle entropies. Tracing the steam turbine cycle, water is pumped from point 130 to point 132. The water is evaporated from point 132 to point 134 in the heat-recovery boiler and then receives its first superheat from point 134 to point 136 in the second gas turbine combustor. The steam then expands to point 138 providing useful work. The steam is again superheated from point 138 to point 140 in the second combustor before expanding again from point 140 to point 142.

Looking now at the steam cooling for the reheat cycle, steam is extracted at cold reheat point 138 and is heated in the first stage nozzles and blading to point 144 below the first combustor exit temperature. It can be noted that the gas turbine cycle ratio of 38 allows for 60 to 70 psi steam pressure drop. About 10 psi (68.95 KPa) would be needed to transport the steam to the blading—making about 50 psi (345 KPa) available for cooling which is much more pressure than now realized for air cooling.

Extraction steam, not shown in FIG. 21, is used for cooling the second-stage blading. Steam at point 158 is extracted for cooling the first-stage blading of the power turbine where the steam is heated from point 158 to point 152 and expanded to point 154. It should be noted that the cooling steam previously used for the gas generator is heated in the second combustor all the way to point 148 before expansion. The gas turbine reheat increases the power developed by the gas generator cooling steam.

Heat is then recovered in the heat recovery boiler from points 150 and 154 to point 156, the assumed 300° F. (149° C.) stack temperature. In accordance with the calculated steam cycle heat balance, the heat in the exhaust steam is converted to useful power at an efficiency of 40.43% LHV to complete the cycle.

The steam flow can be broken down for purposes of analysis schematically as shown in FIG. 22. The cooling steam is separated from the main stream, a procedure often done in analyzing single and double automatic extraction/admission steam turbine cycles.

In the case of the reheat gas turbine, steam in line 160 is extracted from the cold reheat line 162 and is heated in the first stage gas generator blading—designated as heat exchanger 164. Incremental fuel is introduced in line 163 and burned in combustor 170 to heat this steam in line 168 as it passes through and around the blading as will be shown later. The main fuel for the gas turbine enters through inlet line 172.

The cooling steam, after expanding through gas generator turbine 174, is again heated in combustor 176 at heat exchanger 178—the heat being supplied as fuel in line 180. Fuel for the main steam stream enters from line 182; the cooling steam for the power turbine from line 184 and the main gas turbine air flow from line 186.

The heated gas generator turbine cooling steam then expands through power turbine 188 to produce power after which the steam is exhausted to pseudo heat exchanger 190, where heat is extracted to heat the feed water line 192. The final stack temperature of 300° F. (149° C.) is assumed to be compatible with the main heat-recovery boiler stack temperature.

Cooling steam for the power turbine in line 194 is extracted from low-pressure steam turbine 196 and is heated by power turbine first-stage blading designated as heat exchanger 198. The steam then continues to expand to the exhaust where it is also recovered in pseudo heat exchanger 190.

Extraction steam, that is, flows in lines 200, 202 and 204, is used to heat the feed water from 101° F. (38.3° C.) to 240° F. (116° C.). Boiler feed pump 206 raises the temperature to 250° F. (121° C.). It is assumed that the make-up water arrives at an enthalpy (h) of 70 to be compatible with the heat balance cycle of FIG. 22.

The total cooling steam is now heated in another pseudo heat exchanger 208 by fuel from line 210 to bring the stream back to the initial 2415 psia (16.55 MPa) 1000° F. (538° C.) condition. Heat exchanger 208 is necessary to determine the fuel required to complete the loop so that the cooling steam-cycle efficiency can be determined and evaluated.

FIG. 22 can also be used for the simple-cycle gas turbine by eliminating combustor 176 and by extracting the steam at the appropriate steam pressure to allow for adequate injection pressure and piping pressure drop.

Figure 20:
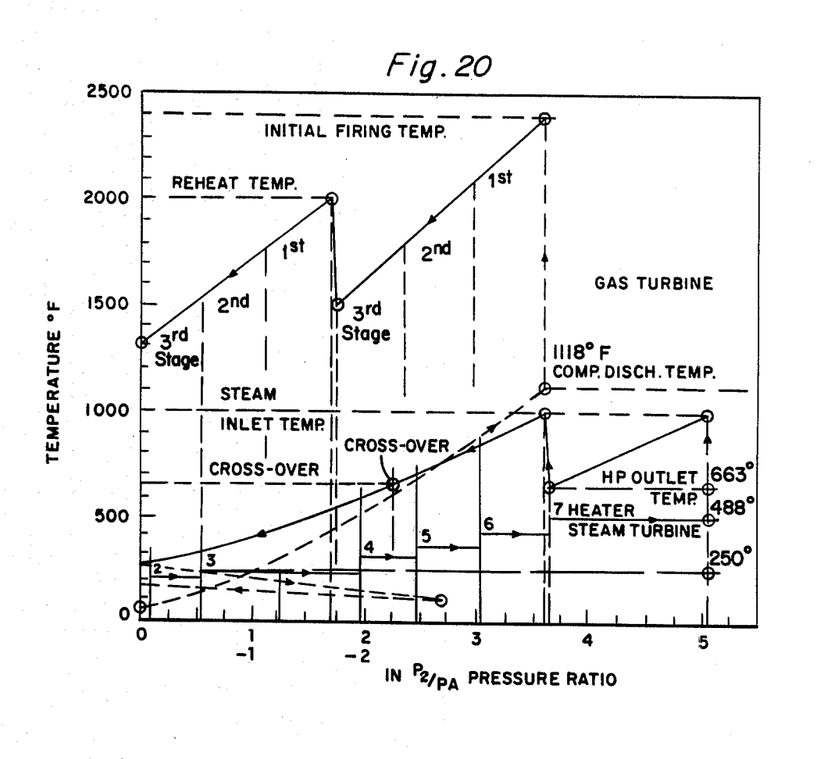
FIG. 20 is a graph showing cycle temperatures of a reheat gas turbine, and also the cycle temperature of a reheat steam turbine, as a function of the natural logarithm of cycle pressure ratio. Alternate paths of 3 and 7 stages of feedwater heating are shown.

FIG. 20 is a plot of both the gas turbine and steam turbine temperatures versus the natural logarithm of the two cycle-pressure ratios. Note that 14.7 psia has been used for $P_a$ and that the steam turbine expansion is inverted to the right where the logarithm values are negative for $P_2/P_4$ ratios less than one. Seven successive heaters are plotted in FIG. 20 from left to right to show at what pressure they fit in the cycle. Also, the steam reheat point and the crossover point for the steam turbine are shown on the graph and illustrate quite clearly why it is necessary to properly integrate the gas turbine pressure with the steam cycle.

Table III presents pertinent data which has been used in the calculations on the 38 cycle-ratio reheat gas turbine firing at 2400°/2000° F. (1316°/1093° C.) to obtain a comparison of air and steam cooling shown in Table IV.

TABLE III

38 Cycle Ratio - 2400/2000° F. Reheat Gas Turbine Data

| | | | |
|---|---|---|---|
| 1. Inlet Press PSIA | 14.70 | 14. No. 2 Comb Firing Temp °F. | 2000 |
| 2. Inlet Temp °F. | 60 | 15. No. 2 Comb Press Loss % | 3 |
| 3. Cycle Press Ratio | 38 | 16. PT Inlet Press PSIA | 78.997 |
| 4. Compression Eff % | 85 | 17. PT Outlet Press PSIA | 14.9 |
| 5. Work of Comp BTU/Lb Air | 265.68 | 18. PT Theo Air % | 400 |
| 6. No. 1 Comb Firing Temp °F. | 2400 | 19. PT Exp Ratio | 5.302/6.59* |
| 7. No. 1 Comb Loss % | 4 | 20. PT Exit Temp °F. | 1297 |
| 8. GG Inlet Press PSIA | 536.26 | 21. PT Net Work BUT/Lb Air | 206.85 |
| 9. GG Exit Press PSIA | 81.44 | 22. Air Leakage % | .5 |
| 10. GG Exit Temp °F. | 1514 | 23. Comb Eff % | .97 |
| 11. GG Exp Ratio | 6.580 | 24. No.1 Comb Fuel BTU/Lb Air | 370.97 |
| 12. GG and PT Exp Eff % | 87 | 25. No. 2 Comb Fuel BTU/Lb Air | 145.53 |
| 13. GG Theo Air % | 400 | 26. Total Fuel BTU/Lb Air | 516.50 |
| | | 27. Cycle Eff % LHV | 40.05 |

*Reflecting GG work given in Table IV

Notations:
GG - Gas Generator
PT - Power Turbine
LHV - Lower Heating Value

Table IV summarizes the effect steam substitution has on over-all combined-cycle efficiency. This table indicates that the over-all combined cycle will be slightly degraded by about 0.7% (0.4% Points). It is doubtful, however, if 2400°/2000° F. (1316°/1093° C.) levels for base-load operation can be accomplished without resorting to steam cooling or some other type of cooling beyond what is currently in use today.

The assumed over-all combined cycle efficiency is determined to be 56% LHV based on the data developed in applicant's application Ser. No. 954,838 when considering 2500°/2050° F. (1371°/1121° C.) firing temperatures to reflect incremental fuel added to heat the cooling steam.

A significant increase in output of 36.2% can be noted when compared to the original gas turbine work. This calculates to be 6% increase for each 1% steam. This added bonus should improve the installed cost per unit of power output of the combined cycle.

TABLE IV

| | Coolant | | Without Cooling Air | | Steam Cooling | |
|---|---|---|---|---|---|---|
| | Air % | Steam % | Work BTU/Lb Air | Fuel BTU/Lb Air | Work BTU/Lb Air | Fuel BTU/Lb Air |
| First-Stage GG | 8 | 3 | | | | |
| GT | | | 10.59 | 10.81 | 21.16 | 60.60 |
| ST | | | — | — | 6.17 | — |
| Second-Stage GG | 4 | 1.5 | | | | |
| GT | | | 4.01 | 4.29 | 9.66 | 28.85 |
| ST | | | — | — | 3.09 | — |
| First-Stage PT | 4 | 1.5 | | | | |

TABLE IV-continued

| | | | | | | | |
|---|---|---|---|---|---|---|---|
| GT | | | .80 | | 4.50 | | 27.34 |
| ST | | | 4.52* | — | 5.89 | | — |
| Sub-Totals | 16.0 | 6.0 | 19.92 | 15.1 | 50.47 | | 116.79 |
| Cycle Eff % | | | 131.9* | | | 43.21 | |

| | | | |
|---|---|---|---|
| Change in PT Exit Temp °F. | 42 | Original GT Work BTU/Lb Air | 206.85 |
| Credit for Exit Temp | | Inc in GT Work % | 24.52 |
| @ 40% work BTU/Lb | 4.52* | Inc in Total Work (Vs GT Work) % | 34.03 |
| Increase in GT Work BTU/Lb Air | 50.72 | Original Comb Cycle Eff % | 56.00 |
| Increase in ST Work BTU/Lb Air | 19.67 | Over-all Cycle Eff % LHV | |
| Total Increase in Work BTU/LB | 70.39 | 50% GT & 50% ST | 55.62 |
| Total Fuel BTU/Lb Air | 131.89 | Overall Cycle Eff % LHV | |
| Over-all Eff of Inc Work % LHV | 53.37 | 60% GT & 40% ST | 55.56 |

*Assuming steam being heated to 300° F. of the 1st and 2nd combustor temperatures. This approach is not very critical and does not change the over-all cycle efficiency very greatly.

Notations:
GG = Gas Generator
GT = Gas Turbine
PT = Power Turbine
ST = Steam Turbine
Gas Turbine Cycle Pressure Ratio = 38
First Combustor Firing Temp °F. = 2500 (Includes fuel added for steam heating)
Second Combustor Firing Temp °F. = 2050 (Includes fuel added for steam heating).

There could be another penalty and consideration in using steam as a blade coolant in that about 20% (of the steam flow) make-up could be required to replace the loss in steam out the stack.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Abbreviations used throughout the application are as follows:
HP—Horsepower
MPa—Megapascals
ER—Expansion Ratio
LHV—Lower Heating Value
h—Enthalpy.

SIU conversion factors are as follows:
BTU = 1.055 KJ
BTU/Lb = 2.326 KJ/Kg
PSI = 6,895 KPa
F = 9/5C + 32.

What is claimed as new is as follows:

1. In the production of useful power wherein compressed heated gas is produced for contacting turbine blading for rotating a turbine shaft, and said turbine blading is cooled, the improvement comprising; introducing steam into the interior of said blading, directing steam from the interior of said blading substantially tangentially onto the exterior surfaces of said blading, the relative velocity of said steam directed onto the surface of said blading being substantially zero with respect to the velocity of said compressed heated gas contacting said blading, whereby the external surface of said blading is covered with a thermal barrier of steam which insulates the blading against radiant and convection heating.

2. The process of claim 1 wherein said blading comprises stationary vanes and rotating blades, said steam being introduced into the interior of said vanes or said rotating blades or both.

3. The process of claim 2 wherein the production of useful power comprises a combined reheat gas turbine and steam turbine cycle wherein said compressed heated gas passes through a gas turbine and is reheated in a combustion cavity for driving a power turbine, said gas after leaving said power turbine exchanging heat to form steam, said formed steam being introduced into the interiors of the blading of either or both of said gas turbine and power turbine to provide said thermal blanket of steam.

4. The process of claim 2 wherein said blading includes an internal steam distribution plenum and at least one steam nozzle communicating with said plenum and open to the external surface of said blading wherein steam is introduced into said plenum and directed out through said steam nozzle to blanket the external surface of said blading with said thermal barrier of steam.

5. The process of claim 4 wherein said blading includes a leading edge portion and a trailing edge portion, said steam nozzle being placed in said leading edge portion and directing steam across said external surfaces toward said trailing edge portion, said trailing edge portion of said blading including therein an internal coolant steam distribution plenum wherein coolant steam introduced therein is also distributed through said coolant steam plenum to a nozzle placed at the trailing end of said blading.

6. The process of claim 5 wherein said steam nozzle placed in the leading edge portion of said blading includes a plurality of heat exchange fins extending from the interior surface thereof to provide convection cooling of said leading edge portion, said heat exchange fins being parallel to the flow of said steam from said distribution plenum to the nozzle opening for guiding said steam through said nozzle.

7. The process of claim 6 wherein said leading edge portion of said stationary vane is attached to a body portion which includes said trailing edge portion, said leading edge portion being separated from the body portion to form a cavity, whereby heat is kept away from said body portion and said leading edge portion is allowed to float, said leading edge portion containing said steam distribution plenum.

8. The process of claim 5 wherein said steam nozzle on said trailing edge portion of said blading includes a plurality of heat exchange fins and ducts therebetween placed on the internal surface thereof wherein coolant steam flowing therethrough serves to absorb heat from the suction side of said trailing edge portion of said blading.

9. The process of claim 5 wherein said leading edge portion on said blading comprises an external protective plasma-sprayed metal alloy coating selected from the group consisting of platinum, chromium and aluminum.

10. The process of claim 9 wherein said leading edge portion on said blading is provided with weep holes for allowing steam to issue therefrom from said distribution plenum, whereby the influx of radiant and convection heat on the leading edge portion is substantially reduced.

11. The process of claim 10 wherein said said leading edge portion on said stationary vane comprises an external coating of a thermal barrier ceramic.

12. The process of claim 5 wherein said steam nozzles placed on the leading edge portions of said blading are in the form of two rows placed on opposite sides of said leading edge portion, said steam issuing from said nozzles providing a thermal blanket of steam on the concave and convex surfaces of said blading.

13. The process of claim 12 wherein the steam nozzles placed on the leading edge of said rotating blades comprise a pair of rows of parallel staggered slots open to the exterior surface of said blades, the rows of slots placed on opposite sides of said leading edge portion and extending substantially across the full width of said blade, whereby steam exiting from said nozzles provide a blanket of steam over the external surfaces of said body portion.

14. The process of claim 10 wherein the leading edge portion of said blading is provided with a woven wire covering placed over said weep holes whereby transpiration cooling of the leading edge portion takes place.

15. The process of claim 4 wherein said thermal blanket of steam steam is provided by exhaust steam from said steam turbine.

16. The process of claim 15 wherein the amount of steam used to blanket said stationary vanes and rotating blades is about 6% by weight of said compressed heated gas passing through said combustion cavity and said power turbine.

17. The process of claim 5 wherein said turbine is started by introducing steam into the leading edge portion of said blading and introducing steam into the trailing edge portion of said blading, allowing steam from said leading edge portion and said trailing edge portion of said blading to strike said rotating blades to heat said blades and start rotation of said blades.

* * * * *